United States Patent Office 3,179,345
Patented Apr. 20, 1965

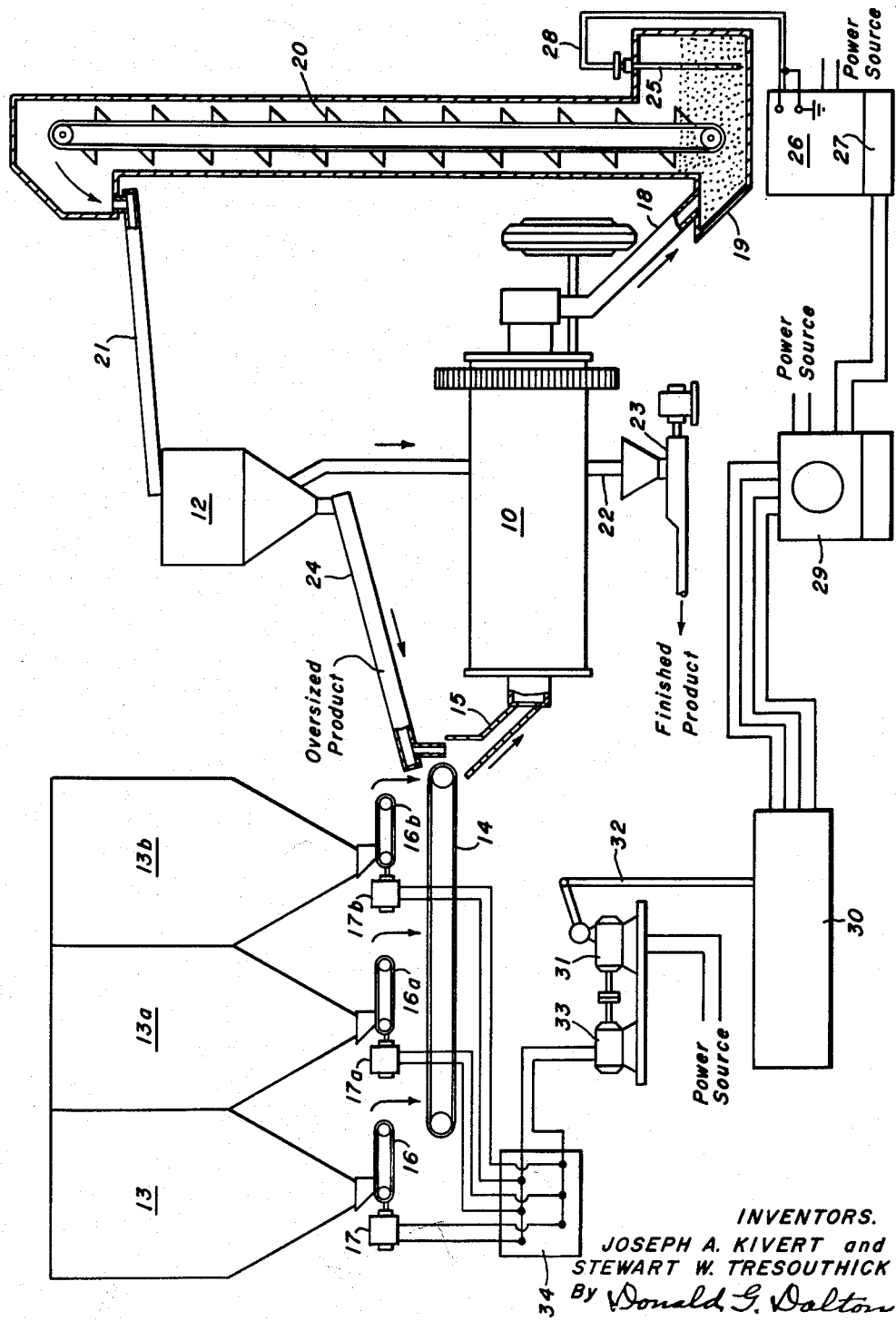

3,179,345
METHOD AND APPARATUS FOR CONTROLLING A GRINDING MILL
Joseph A. Kivert, New Rochelle, N.Y., and Stewart W. Tresouthick, Norwalk, Conn., assignors to United States Steel Corporation, a corporation of New Jersey
Filed July 29, 1963, Ser. No. 298,235
3 Claims. (Cl. 241—30)

This invention relates to an improved method and apparatus for controlling the rate at which solids feed to a closed circuit grinding mill to obtain a finished product of uniform particle size characteristics.

A conventional closed-circuit grinding system includes a grinding mill (for example a rod or ball mill) and a classifier. Material discharges continuously from the mill and goes to the classifier, which separates the material into oversized and finished products. The finished product leaves the system, while the oversized product recirculates through the mill for further grinding. It is known to equip such systems with automatic controls which regulate the feed of new material to maintain a substantially constant load in the grinding mill circuit. Such controls usually measure the noise level of the mill or the power requirements of auxiliary equipment, and adjust the feed rate of new material to maintain this measurement at a constant level. We have observed that such arrangements do not afford exactly the type of control needed for some operations, particularly for a dry system which utilizes a pneumatic classifier.

An object of the present invention is to provide an improved method and apparatus for controlling the feed rate of new material to a closed circuit grinding system in which the quantity of material in the classifier is maintained at a substantially constant level.

A further object is to provide a control method and apparatus of the foregoing type in which measurements are taken of the level of material in the boot of a bucket elevator carrying material from the mill to the classifier to obtain the necessary intelligence.

A more specific object is to provide a control method and apparatus of the foregoing type which includes a device for sensing the level of material in the elevator boot, and instruments operatively connected with said device and with the feed motors for new material to adjust the feed rate of the latter to maintain a constant level of material in the elevator boot.

In the drawing:

The single figure is a diagrammatic side-elevational view of a grinding system equipped with a control apparatus constructed according to our invention.

The drawing shows a grinding system which includes a rod or ball mill 10 and a pneumatic classifier 12. New material, such as dry cement clinker, feeds continuously from a series of bins 13, 13a and 13b to a feed conveyor belt 14, which carries the material to a chute 15 leading to the mill. Bins 13, 13a and 13b are equipped with feeders 16, 16a and 16b respectively driven by variable speed motors 17, 17a and 17b. The quantity of material feeding from each bin can be varied by varying the speed of its motor. Material discharges continuously from the mill through a chute 18 and thence into an elevator boot 19. A bucket elevator 20 continuously carries material from boot 19 to a chute 21 and thence to the classifier 12. The finished product from the classifier leaves the system via a line 22 and a pump 23. The oversized product continuously returns to mill 10 via a chute 24 which leads to chute 15. Since all the foregoing parts are conventional, no more detailed showing is deemed necessary.

In accordance with the present invention, we equip the elevator boot 19 with a device 25 which continuously senses the level of material therein. Preferably the sensing device is a conventional capacitance probe, although we can use other types, for example, a bubble tube or a radiation gage. A suitable capacitance probe is available commercially from Robertshaw-Fulton Controls Company as the Model Y705R-A3-T-72. We connect the sensing device to a conventional recorder-controller 26 equipped with a set point station 27. A suitable recorder-controller for use with the foregoing capacitance probe is available commercially from the same supplier as the Level/Log R-F Capacitance Recorder and Controller. In this example the connection between the probe 25 and recorder-controller 26 is through a coaxial cable 28. In the example we connect another conventional recorder-controller 29 with the recorder-controller 26. A suitable recorder-controller 29 is available commercially from Leeds and Northrup as the Series 60, 3-action, PAT Control for use with 10260 Series Drive. We connect the second recorder-controller 29 to a conventional drive unit 30. A suitable drive unit is available commercially from the same supplier as the No. 10264-60 unit. We connect the drive unit 30 to a variable speed motor 31 through a mechanical linkage 32. Motor 31 drives a variable speed alternator 33, which is connected to the feeder motors 17, 17a and 17b through a switch box 34.

In practicing our control method, we adjust the setpoint station 27 to the level of material we wish to maintain in the elevator boot 19. The sensing device 25 transmits a signal to the recorder-controller 26 representative of the actual level of material therein. If the level drops, the recorder-controller 26 acts through the recorder-controller 29, drive unit 30 and linkage 32 to increase the speed of motor 31. The voltage output of the alternator 33 increases accordingly, and drives the feeder motors 17, 17a and 17b at a greater speed to feed more new material to the mill 10. Consequently a greater quantity of material discharges from the mill into the boot, and the level therein is restored to that previously set at the set point station. The reverse action takes place if the level rises. As long as the level of material in the boot remains constant and the bucket elevator 20 runs at constant speed, the bucket elevator carries a constant quantity of material to the classifier 12. A pneumatic classifier operates most efficiently when it receives material at a constant rate which is close to its full capacity. The particle size of the finished product is more nearly uniform when these conditions are observed. We set the level of material in the elevator boot to deliver the optimum quantity of material to our classifier. We can also adjust the elevator speed if necessary to feed the optimum quantity.

While we have shown and described only a single embodiment of the invention, it is apparent that modifications may arise. Therefore, we do not wish to be limited to the disclosure set forth but only by the scope of the appended claims.

We claim:

1. In a closed-circuit grinding process in which new material feeds continuously to a grinding mill, material discharges continuously from the mill to an elevator boot, an elevator continuously carries material from the boot to a classifier, a finished product is recovered from the classifier, and an oversized product continuously returns from the classifier to the mill for further grinding, a control method comprising sensing the level of material in said boot, and adjusting the rate at which new material feeds to said mill in accordance with the level sensed in said boot to maintain this level substantially constant, whereby the quantity of material in the classifier remains substantially constant and close to the full capacity thereof.

2. In a closed-circuit grinding system which includes a grinding mill, an adjustable feeder for continuously feeding new material to said mill, an elevator boot for continuously receiving material discharging from said mill, an elevator for continuously carrying material from said boot, a classifier for receiving material from said elevator and separating them into a finished product and an oversized product, and means for returning the oversized product from said classifier to said mill for further grinding, the combination therewith of a control apparatus comprising a device for sensing the level of material in said boot, and means operatively connected with said device and said feeder for adjusting the feed rate of new material to maintain the level of material in said boot substantially constant, whereby said elevator carries a substantially constant quantity of material to said classifier, which quantity is close to the full capacity of the classifier.

3. An apparatus as defined in claim 2 in which said sensing device is in the form of a capacitance probe, and said last-named means includes recorder-controllers and a drive unit.

References Cited by the Examiner
UNITED STATES PATENTS 1,778,393  10/30  Klugh.
3,114,510  12/63  McCarty et al. _____ 241—34

J. SPENCER OVERHOLSER, *Primary Examiner.*